United States Patent
Laselva et al.

(10) Patent No.: US 10,419,969 B2
(45) Date of Patent: Sep. 17, 2019

(54) INTERFACE FUNCTIONALITY FOR RAN-WLAN RADIO AGGREGATION

(71) Applicant: Nokia Solutions and Networks Oy, Espoo (FI)

(72) Inventors: Daniela Laselva, Klarup (DK); Andrea Cattoni, Nibe (DK); Claudio Rosa, Randers (DK)

(73) Assignee: Nokia Solutions and Networks Oy, Espoo (FI)

( * ) Notice: Subject to any disclaimer, the term of this patent is extended or adjusted under 35 U.S.C. 154(b) by 316 days.

(21) Appl. No.: 15/522,405

(22) PCT Filed: Nov. 6, 2014

(86) PCT No.: PCT/EP2014/073887
§ 371 (c)(1),
(2) Date: Apr. 27, 2017

(87) PCT Pub. No.: WO2016/070921
PCT Pub. Date: May 12, 2016

(65) Prior Publication Data
US 2017/0318493 A1    Nov. 2, 2017

(51) Int. Cl.
*H04W 28/02*        (2009.01)
*H04L 12/801*       (2013.01)
*H04L 12/825*       (2013.01)
*H04W 28/08*        (2009.01)
*H04L 12/26*        (2006.01)
*H04L 12/851*       (2013.01)
*H04W 84/12*        (2009.01)

(52) U.S. Cl.
CPC ....... *H04W 28/0273* (2013.01); *H04L 43/062* (2013.01); *H04L 47/14* (2013.01);
(Continued)

(58) Field of Classification Search
CPC ... H04W 84/02; H04W 84/12; H04W 84/042; H04W 28/0273; H04W 80/06;
(Continued)

(56) References Cited

U.S. PATENT DOCUMENTS

2013/0029639 A1    1/2013  Lee
2014/0328254 A1*  11/2014  Lim ................ H04W 36/0055
                                                    370/328
(Continued)

FOREIGN PATENT DOCUMENTS

EP       2675241       12/2013
WO     2014111808       7/2014

OTHER PUBLICATIONS

Office Action received for corresponding European Patent Application No. 14795619.7, dated Jun. 14, 2018, 5 pages.
(Continued)

*Primary Examiner* — Ashley Shivers
(74) *Attorney, Agent, or Firm* — Nokia Technologies Oy

(57) ABSTRACT

There are provided measures for enabling/realizing interface functionality for RAN-WLAN radio aggregation, i.e. radio level integration/aggregation between a cellular radio access network and a wireless area network. Such measures exemplarily comprise user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, providing feedback on performance of user-plane data packets transport using the reliable transport protocol, at least partly, from the wireless local area network to the cellular radio access network, and executing flow control on the basis of the performance feedback.

19 Claims, 10 Drawing Sheets

(52) U.S. Cl.
CPC .......... *H04L 47/2441* (2013.01); *H04L 47/26* (2013.01); *H04W 28/0236* (2013.01); *H04W 28/0252* (2013.01); *H04W 28/08* (2013.01); *H04W 84/12* (2013.01)

(58) Field of Classification Search
CPC ..... H04W 80/00; H04W 28/02; H04W 28/10; H04L 47/26; H04L 47/2441; H04L 43/062; H04L 47/14
See application file for complete search history.

(56) References Cited

U.S. PATENT DOCUMENTS

| | | | | |
|---|---|---|---|---|
| 2016/0286470 | A1* | 9/2016 | Lee | H04W 48/16 |
| 2017/0006634 | A1* | 1/2017 | Luo | H04W 74/085 |

OTHER PUBLICATIONS

"New SI Proposal: LTE-WLAN Radio Level Integration", 3GPP TSG-RAN meeting #65, RP-141276, Agenda: 14.1.2, Intel Corporation, Sep. 9-12, 2014, 6 Pages.

"Study Item Proposal on E-UTRAN and WLAN Aggregation", 3GPP TSG-RAN meeting #65, RP-141400, Agenda: 14.1.2, Qualcomm Incorporated, Sep. 9-12, 2014, 6 Pages.

Dommety, "Key and Sequence Number Extensions to GRE", RFC 2890, Network Working Group, Sep. 2000, pp. 1-7.

"3rd Generation Partnership Project; Technical Specification Group Services and System Aspects; Architecture enhancements for non-3GPP accesses (Release 12)", 3GPP TS 23.402, V12.6.0, Sep. 2014, pp. 1-288.

Stewart, "Stream Control Transmission Protocol", RFC 4960, Network Working Group, Sep. 2007, pp. 1-152.

"Necessity of Flow Control for Various U-plane Alternatives", 3GPP TSG-RAN Working Group 2 meeting #84, R2-134116, Agenda: 7.2.2.2, BlackBerry UK Limited, Nov. 11-15, 2013, 4 Pages.

"3rd Generation Partnership Project; Technical Specification Group Radio Access Network; E-UTRAN X2 Interface User Plane Protocol (Release 12)", 3GPP TS 36.425, V0.3.0, Oct. 2014, pp. 1-15.

"Discussion on the Direct Interface Between RAN and WLAN", 3GPP TSG-RAN3 meeting #87, R3-150022, Agenda: 17.2.2, Huawei, Feb. 9-13, 2015, 4 Pages.

International Search Report and Written Opinion received for corresponding Patent Cooperation Treaty Application No. PCT/EP2014/073887, dated Jul. 24, 2015, 9 pages.

* cited by examiner

INTERFACE FUNCTIONALITY FOR RAN-WLAN RADIO AGGREGATION

RELATED APPLICATION

This application was originally filed as PCT Application No. PCT/EP2014/073887 filed Nov. 6, 2014.

FIELD

The present invention relates to interface functionality for RAN-WLAN radio aggregation. More specifically, the present invention relates to measures (including methods, apparatuses and computer program products) for enabling/realizing interface functionality for RAN-WLAN radio aggregation, i.e. radio level integration/aggregation between a cellular radio access network and a wireless area network.

BACKGROUND

In cellular communication systems, there is a trend of enabling/realizing interworking between a cellular radio access network (RAN), such as a LTE, LTE-A or UMTS radio access network (e.g. E-UTRAN), and a wireless area network (WLAN) so as to enhance capacity and/or coverage. Such interworking includes radio level integration/aggregation hereinafter denoted as RAN-WLAN radio aggregation. The RAN-WLAN radio aggregation basically provides for dual connectivity for terminals being simultaneously served by both the RAN and the WLAN via respective radio interfaces, wherein the serving RAN network element (e.g. eNodeB or RNC) and the serving WLAN network element (e.g. WLAN AP or WAG) are interconnected, while being either collocated, i.e. implemented in an integrated manner, or non-collocated, i.e. implemented in a separate manner with a near-ideal backhaul link therebetween.

Conceptually, such RAN-WLAN radio aggregation would be alike LTE dual connectivity with bearer split functionality (typically referred to as DC-3C) currently under standardization in 3GPP. Alike the latter, in RAN-WLAN radio aggregation, the RAN network element would act as the master node (or, stated in other words, the anchor point), and the WLAN network element would act as the slave node. The main objectives in this regard are the support of network-controlled mechanisms which enable spectrum aggregation gains (including fine load balancing between RAN and WLAN).

In order to support RAN-WLAN radio aggregation, a specified (logical) interface between the RAN network element and the WLAN network element is required for facilitating user-plane data forwarding from the RAN over the WLAN to dual-connectivity terminals, such that proper combination of user-plane data via the RAN path and the WLAN path is enabled at the terminal side, under the assumption that the anchor point of the aggregation is located at the RAN network element.

More specifically, when performing packet-wise radio level integration/aggregation between RAN and WLAN, the RAN network element (e.g. eNodeB or RNC) determines on a packet basis whether to transmit a packet over the RAN path or the WLAN path to the terminal. The determination can be based on various performance metrics related to the dynamic performance of the two networks in terms of e.g. available capacity, packet delay, packet loss rate per network, or the like.

In order to optimally adjust the user-plane data flow (i.e. increase/maintain/decrease the data flow speed) between the RAN network element (e.g. eNodeB or RNC) and the WLAN network element (e.g. WLAN AP or WAG), a flow control mechanism is required. To this end, a feedback of performance metrics from the WLAN to the RAN is required as a basis for flow control.

In order to achieve good performance for dual connectivity and make aggregation work in practice, reliable/assured user-plane data packet delivery is required. Otherwise, unreliable/unassured packet delivery including packet losses would be harmful to the aggregation in stalling higher layer protocols such as TCP which would interpret e.g. packet losses as an ongoing congestion slowing down the data rate.

Accordingly, there is a demand for enabling/realizing an interface functionality for RAN-WLAN radio aggregation, i.e. radio level integration/aggregation between a cellular radio access network and a wireless area network.

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided a method comprising controlling user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, obtaining feedback on performance of user-plane data packets transport using the reliable transport protocol, at least, from the wireless local area network, and executing flow control for the user-plane data forwarding from the cellular radio access network over the wireless local area network to the terminal on the basis of the obtained performance feedback.

In certain example developments according to exemplifying embodiments of the present invention, such example method may be operable at or by a base station or controller of the cellular radio access network.

According to an example aspect of the present invention, there is provided a method comprising receiving user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, detecting performance of user-plane data packets transport using the reliable transport protocol, and providing performance data of the detected performance to the wireless local area network for providing performance feedback to the cellular radio access network.

In certain example developments according to exemplifying embodiments of the present invention, such example method may be operable at or by the terminal.

According to an example aspect of the present invention, there is provided an apparatus comprising a processor, and a memory configured to store computer program code, wherein the processor is configured to cause the apparatus to perform: controlling user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, obtaining feedback on performance of user-plane data packets transport using the reliable transport protocol, at least, from the wireless local area network, and executing flow control for the user-plane data forwarding from the cellular radio access network over the wireless local area network to the terminal on the basis of the obtained performance feedback.

In certain example developments according to exemplifying embodiments of the present invention, such example apparatus may be operable as or at a base station or controller of the cellular radio access network.

According to an example aspect of the present invention, there is provided an apparatus comprising a processor, and a memory configured to store computer program code, wherein the processor is configured to cause the apparatus to perform: receiving user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, detecting performance of user-plane data packets transport using the reliable transport protocol, and providing performance data of the detected performance to the wireless local area network for providing performance feedback to the cellular radio access network.

In certain example developments according to exemplifying embodiments of the present invention, such example apparatus may be operable as or at the terminal.

According to an example aspect of the present invention, there is provided an apparatus comprising means for controlling user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, means for obtaining feedback on performance of user-plane data packets transport using the reliable transport protocol, at least, from the wireless local area network, and means for executing flow control for the user-plane data forwarding from the cellular radio access network over the wireless local area network to the terminal on the basis of the obtained performance feedback.

In certain example developments according to exemplifying embodiments of the present invention, such example apparatus may be operable as or at a base station or controller of the cellular radio access network.

According to an example aspect of the present invention, there is provided an apparatus comprising means for receiving user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, means for detecting performance of user-plane data packets transport using the reliable transport protocol, and means for providing performance data of the detected performance to the wireless local area network for providing performance feedback to the cellular radio access network.

In certain example developments according to exemplifying embodiments of the present invention, such example apparatus may be operable as or at the terminal.

According to an example aspect of the present invention, there is provided a computer program product comprising computer-executable computer program code which, when the program code is executed (or run) on a computer or the program is run on a computer (e.g. a computer of an apparatus according to any one of the aforementioned apparatus-related example aspects of the present invention), is configured to cause the computer to carry out the method according to any one of the aforementioned method-related example aspects of the present invention.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

In certain example developments according to exemplifying embodiments of the present invention, the cellular radio access network may comprises a radio access network of a LTE, a LTE-A, or an UMTS system, and/or the wireless local area network may comprise a wireless local area network according to an IEEE 802.11 standard, and/or the reliable transport protocol may comprise SCTP or TCP, and/or the cellular data convergence protocol may comprise PDCP, and/or a cellular tunneling protocol may comprise GTP-U.

Further developments and/or modifications of the aforementioned exemplary aspects of the present invention are set out in the following.

By way of exemplifying embodiments of the present invention, an interface functionality for RAN-WLAN radio aggregation, i.e. radio level integration/aggregation between a cellular radio access network and a wireless area network, can be enabled/realized. Based on such interface functionality, reliable user-plane data packet delivery and flow control for user-plane data forwarding can be enabled/realized for RAN-WLAN radio aggregation.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
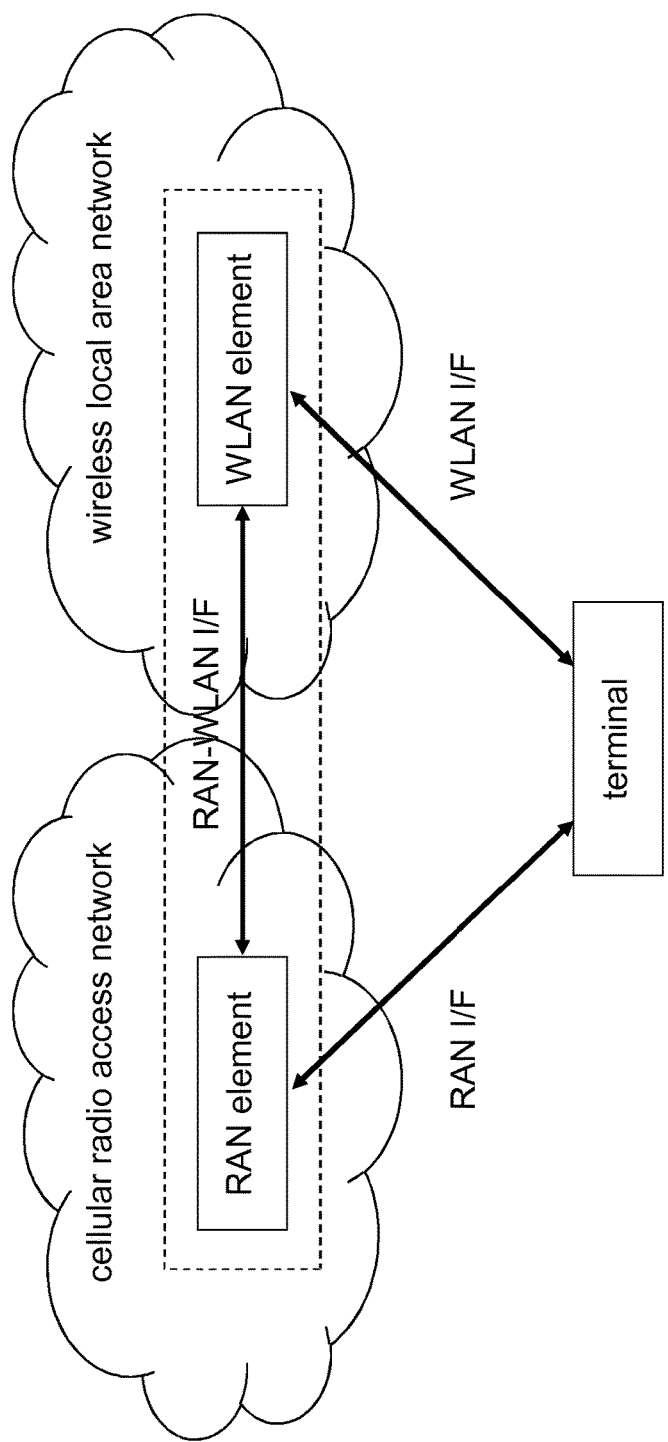
FIG. 1 shows a schematic diagram illustrating a system configuration, for which exemplifying embodiments of the present invention are applicable.

The present invention is described herein with reference to particular non-limiting examples and to what are presently considered to be conceivable embodiments of the present invention. A person skilled in the art will appreciate that the present invention is by no means limited to these examples and embodiments, and may be more broadly applied.

It is to be noted that the following description of the present invention and its embodiments mainly refers to specifications being used as non-limiting examples for certain exemplifying network configurations and system deployments. Namely, the present invention and its embodiments are mainly described in relation to 3GPP and IEEE specifications being used as non-limiting examples. As such, the description of exemplifying embodiments given herein specifically refers to terminology which is directly related thereto. Such terminology is only used in the context of the presented non-limiting examples and embodiments, and does naturally not limit the invention in any way. Rather, any other system configuration or deployment may equally be utilized as long as complying with what is described herein and/or exemplifying embodiments described herein are applicable to it.

Hereinafter, various exemplifying embodiments and implementations of the present invention and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown. For sake of clarity and lucidity, all of the exemplary network system configurations and structures are illustrated in a simplified manner.

According to exemplifying embodiments of the present invention, in general terms, there are provided measures and mechanisms for enabling/realizing an interface functionality for RAN-WLAN radio aggregation, i.e. radio level integration/aggregation between a cellular radio access network and a wireless area network.

FIG. 1 shows a schematic diagram illustrating a system configuration, for which exemplifying embodiments of the present invention are applicable.

As shown in FIG. 1, a dual-connectivity scenario for a terminal using RAN-WLAN interworking is illustrated, as outlined above. In this exemplary dual-connectivity scenario, a RAN element of a cellular radio access network (RAN) is inter-connected with a WLAN element of a wireless local area network (WLAN) via a RAN-WLAN interface, and both the RAN element and the WLAN element serve a terminal via a respective radio interface. The RAN element and the WLAN element may be non-collocated, as illustrated, or collocated, as indicated by a dashed block. As indicated above, in RAN-WLAN radio aggregation, the RAN element acts as the master node (or, stated in other words, the anchor point), which determines whether user-plane data is to be forwarded via the RAN path or the WLAN path, and the WLAN element acts as the slave node.

Accordingly, the dual-connectivity scenario facilitates RAN-based anchoring of a (split) bearer, i.e. a (split) cellular transport bearer, over the WLAN path, wherein the RAN serves (at least) as the control and mobility anchor for the WLAN. Thereby, capacity and/or coverage of the RAN or the overall cellular communication system can be enhanced, data can be (at least partially) offloaded from the RAN or the overall cellular communication system to the WLAN, and so on. In such dual-connectivity scenario, user-plane data from one radio bearer can be transmitted at the same time via the RAN path and the WLAN path.

For example, the RAN may be an E-UTRAN of a LTE or LTE-A system, and the RAN element may be an eNodeB thereof, or the RAN may be an UTRAN of an UMTS or HSPA system, and the RAN element may be a RNC thereof. For example, the WLAN may be an IEEE 802.11-conformant network, and the WLAN element may be ((a combination of) one or more of) a WLAN AP, an AP controller or a WAG thereof. Also, the WLAN element may be a WLAN interworking gateway, hereinafter referred to as WIG, which represents a gateway element for facilitating interworking between RAN and WLAN, as exemplified below.

Figure 2:
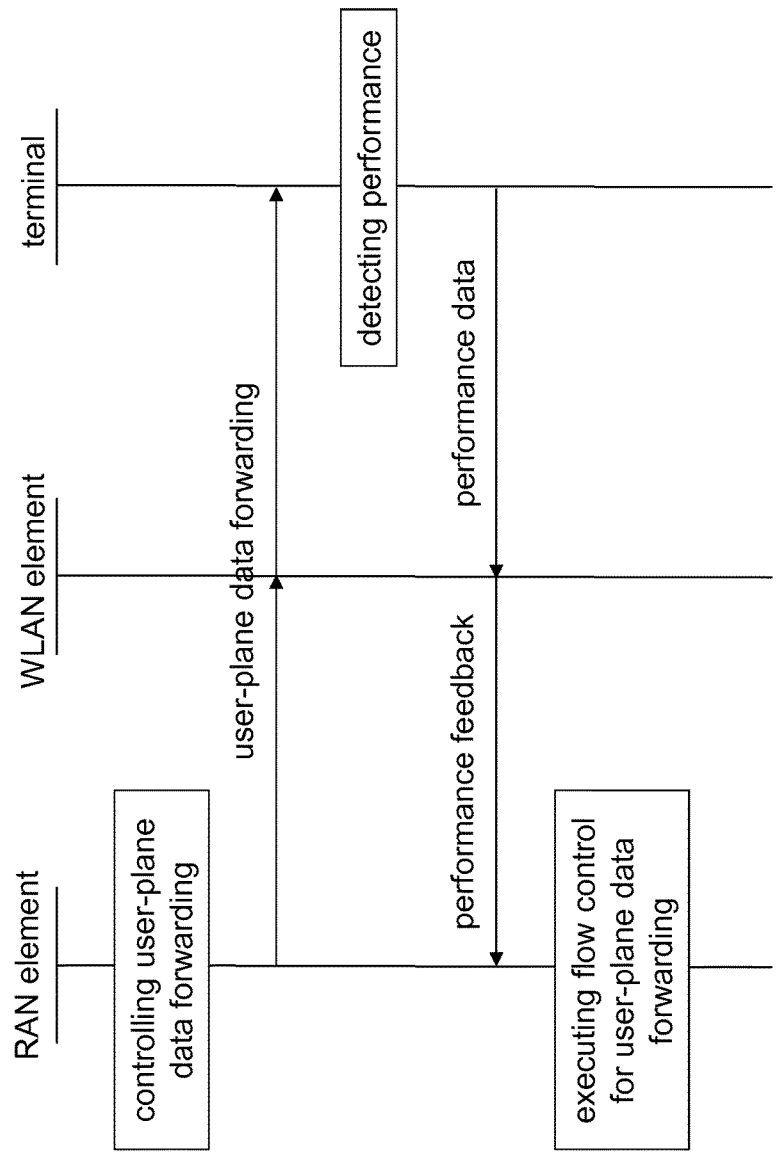
FIG. 2 shows a flow diagram illustrating a procedure according to exemplifying embodiments of the present invention.

FIG. 2 shows a flow diagram illustrating a procedure according to exemplifying embodiments of the present invention. The thus illustrated procedure is applicable in the system configuration of FIG. 1, i.e. dual-connectivity scenario for the terminal with RAN-WLAN radio aggregation, wherein both the RAN and the WLAN provide radio level connectivity for the terminal.

As illustrated in FIG. 2, a procedure according to exemplifying embodiments of the present invention basically comprises the following sequence of operations. The RAN element controls user-plane data forwarding from the RAN (i.e. the RAN element) over the WLAN (i.e. the WLAN element) to the terminal, wherein user-plane data packets according to a cellular data convergence protocol (representing the RAN interface between the RAN element and the terminal) are transported, at least partly, using a reliable transport protocol over the WLAN to the terminal. The terminal receives the user-plane data forwarding from the RAN (i.e. the RAN element) over the WLAN (i.e. the WLAN element). Thereupon, the terminal detects performance of user-plane data packets transport using the reliable transport protocol, and provides performance data of the detected performance to the WLAN (i.e. the WLAN element) for providing performance feedback to the RAN (i.e. the RAN element). The RAN element obtains performance feedback, at least, from the WLAN (i.e. the WLAN element), and executes flow control for the user-plane data forwarding on the basis of the obtained performance feedback.

Figure 5:
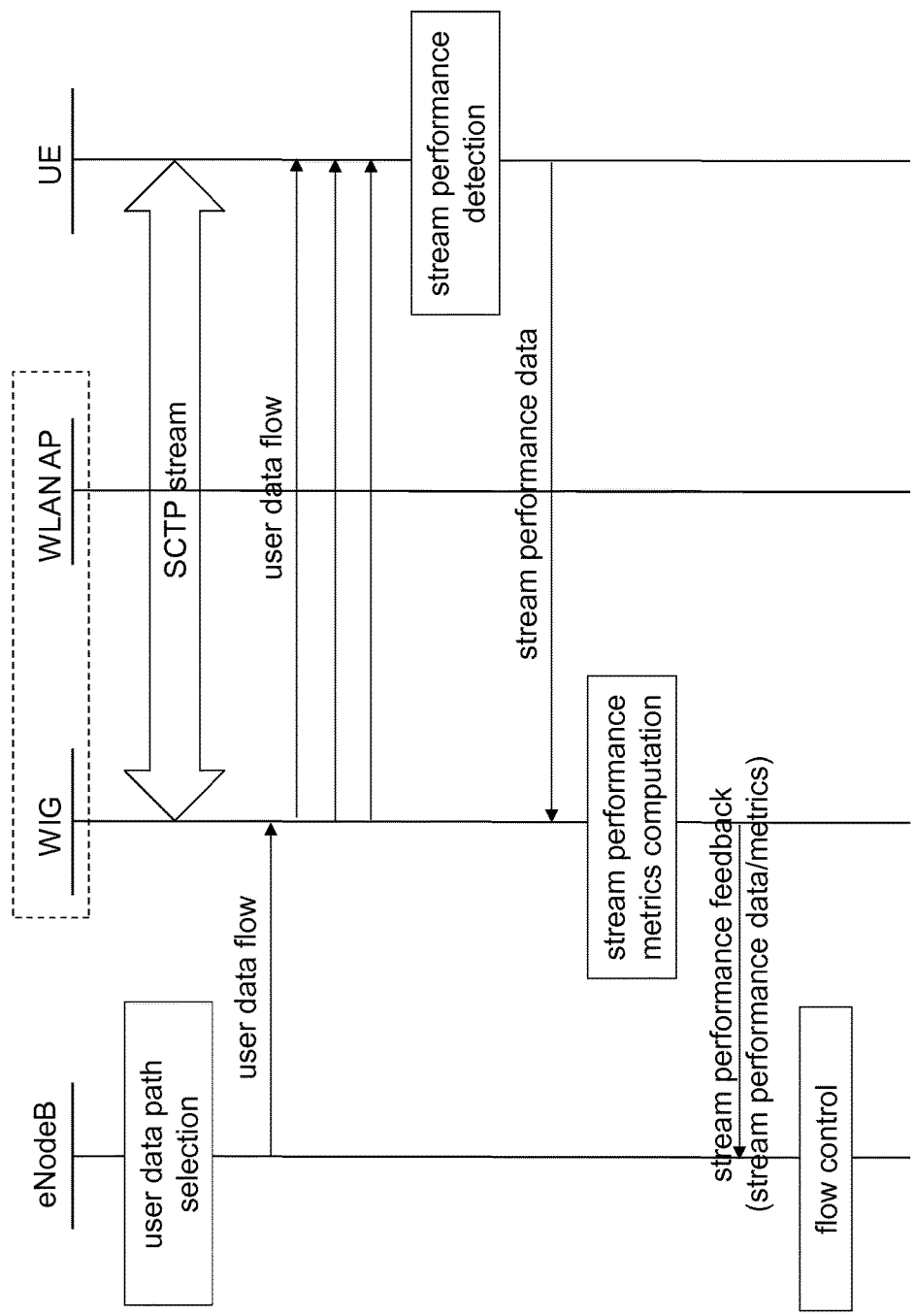
FIG. 5 shows flow diagram illustrating an example of a procedure on the basis of the first protocol stack design according to exemplifying embodiments of the present invention.
Figure 6:
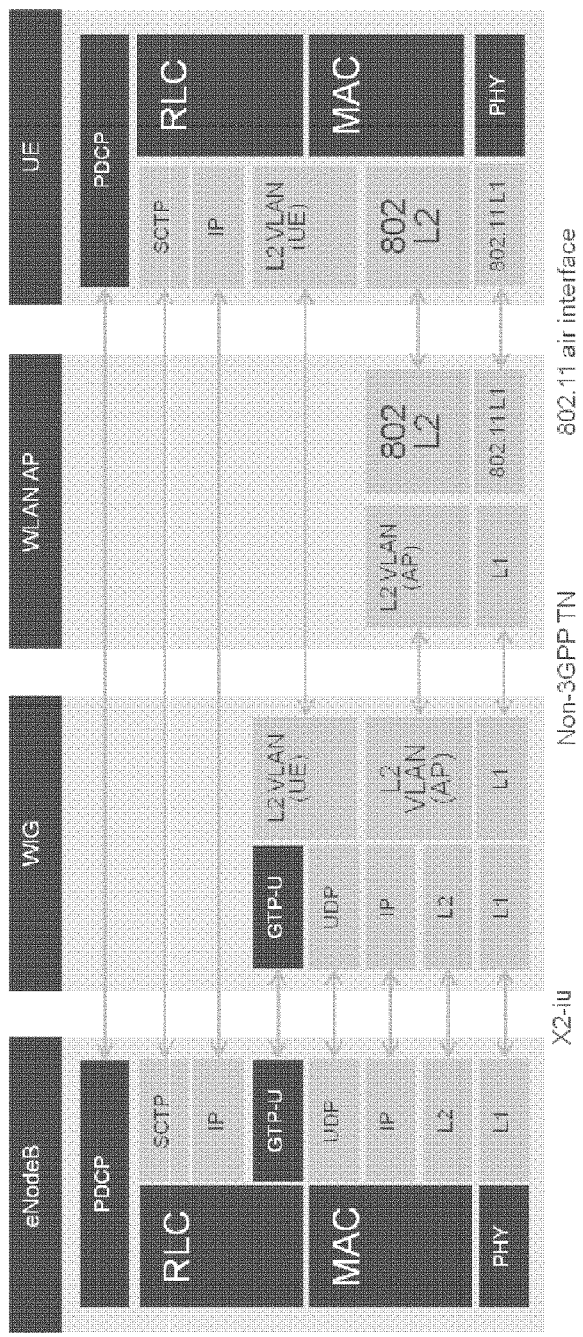
FIG. 6 shows a diagram of a third protocol stack design according to exemplifying embodiments of the present invention.
Figure 7:
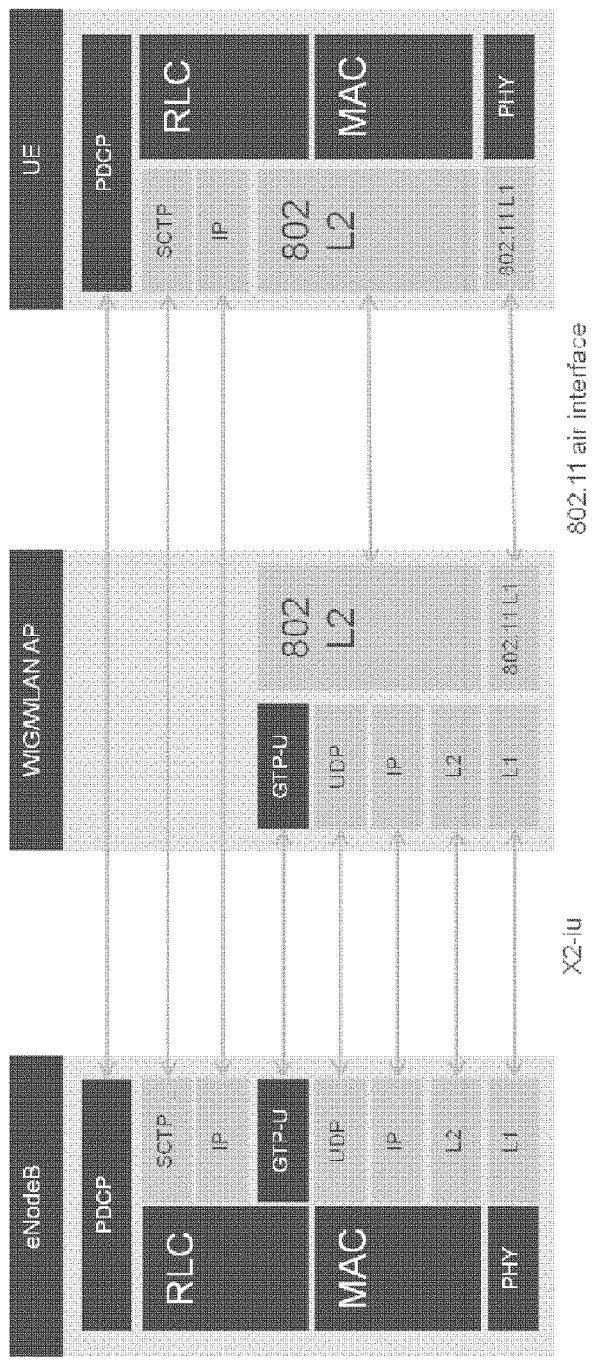
FIG. 7 shows a diagram of a fourth protocol stack design according to exemplifying embodiments of the present invention.
Figure 8:
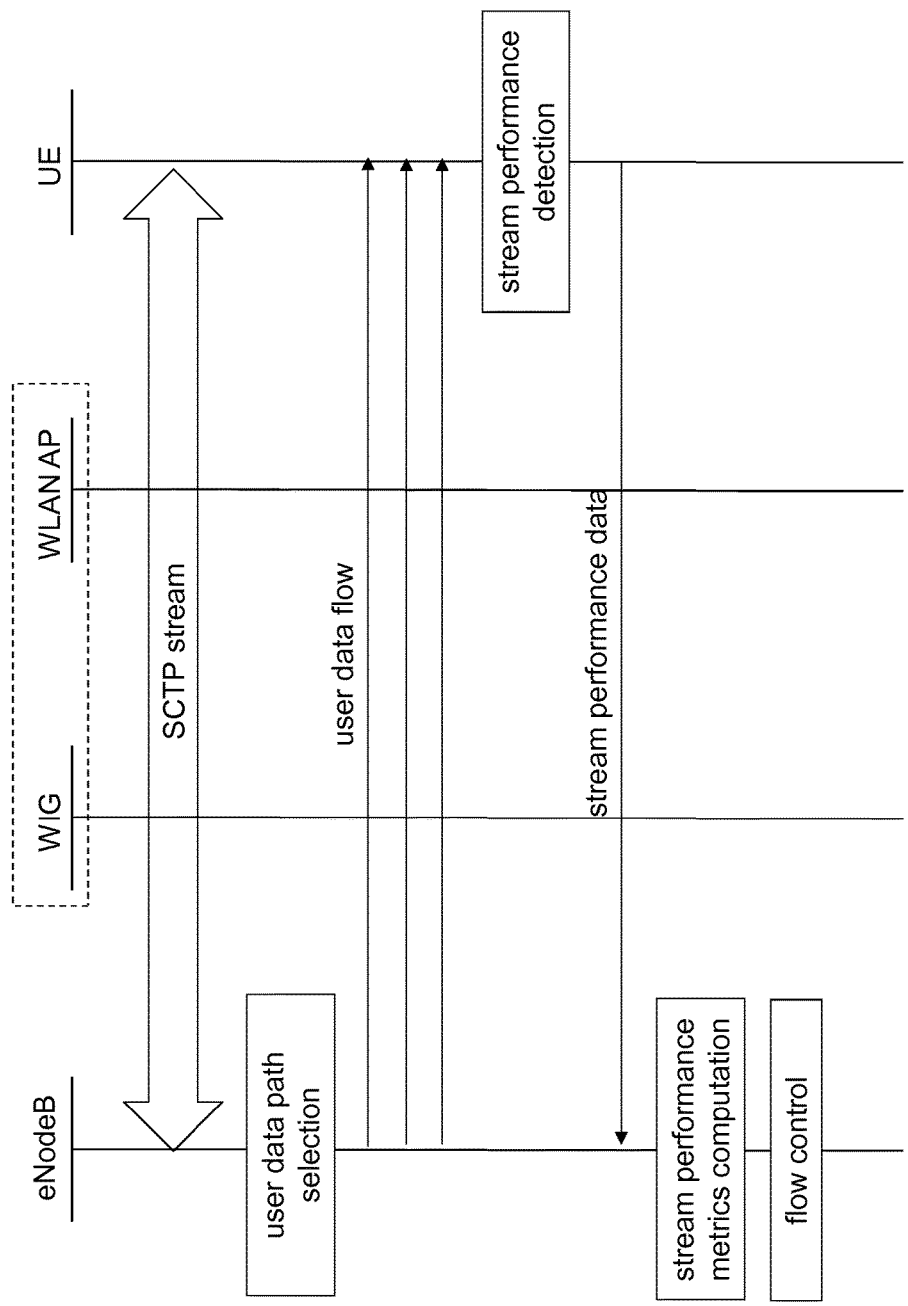
FIG. 8 shows flow diagram illustrating an example of a procedure on the basis of the second or third protocol stack design according to exemplifying embodiments of the present invention.

According to exemplifying embodiments of the present invention, obtaining performance feedback at the RAN may comprise receiving performance data and/or performance metrics, or kind of flow control request, from the WLAN (as in the exemplary cases of FIGS. 3 to 5), or receiving performance data from the WLAN and, optionally, computing/deriving performance metrics based thereon at the RAN (as in the exemplary cases of FIGS. 6 to 8).

In the following, various exemplary implementations are described for the example case of LTE-WLAN radio aggregation. Accordingly, an eNodeB is adopted as a non-limiting example of a RAN element, a WIG or a WIG/WLAN AP combination is adopted as a non-limiting example of a WLAN element, and an UE is adopted as a non-limiting example of a terminal.

It is noted that, with proper adaption, similar exemplary implementations, i.e. similar protocol stack designs and functional/operational principles as described hereinafter, can also be applied other system configuration, such as e.g. UMTS/HSPA-WLAN radio aggregation where e.g. the WIG could be connected to the RNC instead of the eNodeB.

In the thus described exemplary implementations, SCTP is adopted as a non-limiting example of the reliable transport protocol for user-plane data forwarding. Yet, any reliable transport protocol, i.e. a protocol providing for a reliable packet delivery, may be adopted in this regard, such as TCP. Herein, reliable packet delivery could mean, for example, acknowledged/error-free/non-duplicated transfer of user data packets/messages and/or sequenced delivery of user data packets/messages. Further, it is beneficial to adopt a reliable transport protocol which also provides congestion avoidance and control functions, as in the case of SCTP.

According to exemplifying embodiments of the present invention, SCTP as specified in RFC 4960 is adopted due to its functionality useful for the technical situation and problem underlying the present invention. Namely, SCTP enables reliable packet delivery by using sequence numbers, acknowledgments, congestion windows, checksums and retransmission techniques. Among other features, SCTP also includes congestion avoidance and control functions, and supports both acknowledged error-free non-duplicated transfer of user data and sequenced delivery of user messages within multiple streams, with an option for order-of-arrival delivery of individual user messages. As regards flow control capabilities, SCTP provides the functions of Selective Ack (SACK) and report of gaps in received DATA TSNs. The former is to acknowledge received DATA chunks and to inform the peer endpoint of gaps in the received subsequence of DATA chunks as represented by their Transmission Sequence Numbers (TSNs). The latter is to examine the continuity of the TSNs received by an endpoint upon the reception of a new DATA chunk, wherein, if the endpoint detects a gap in the received DATA chunk sequence, it should send a SACK with Gap Ack Blocks immediately, the data receiver continues sending a SACK after receipt of each SCTP packet that does not fill the gap, and—based on the Gap Ack Block from the received SACK—the endpoint can calculate the missing DATA chunks and make decisions on whether to retransmit them.

In the thus described exemplary implementations, PDCP is adopted as a non-limiting example of the cellular data convergence protocol (representing the RAN interface between the RAN element and the terminal). Yet, any cellular protocol representing a cellular air interface may be adopted in this regard, such as RLC (applicable e.g. with 3G on the RAN side), MAC convergence sub-layer of Wi-MAX (applicable e.g. with Wi-MAX on the RAN side, or the like).

In the thus described exemplary implementations, GTP-U is adopted as a non-limiting example of a cellular tunneling protocol. Yet, any protocol applicable in the cellular radio access network may be adopted in this regard, such as GRE, or the like. Further, it is noted that no specific cellular tunneling protocol needs to be used for communication between RAN and WLAN, but GTP-U is used herein just as a non-limiting example for a protocol providing for proper signalling between RAN and WLAN.

Figure 3:
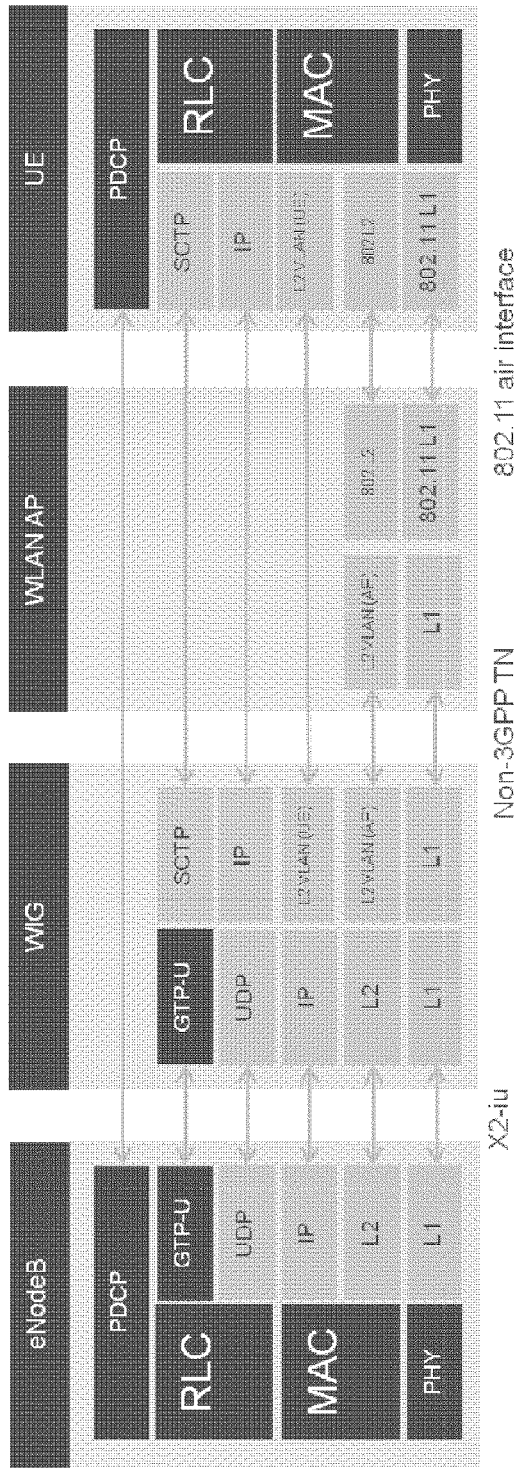
FIG. 3 shows a diagram of a first protocol stack design according to exemplifying embodiments of the present invention.

FIG. 3 shows a diagram of a first protocol stack design according to exemplifying embodiments of the present invention.

The protocol stack design of FIG. 3 is based on the assumption that, for scalability reasons, the eNodeB does not communicate directly with the WLAN AP, but it communicates directly with a WLAN interworking gateway (WIG). The WIG provides further interworking functionalities, as described below, and it can be conceived, in an exemplary implementation, as a sub-module of a regular WLAN Access Gateway (WAG). The interface between the eNodeB and the WIG can be regarded as a specified (logical) interface between a RAN network element and a WLAN network element according to exemplifying embodiments of the present invention, herein denoted as X2-iu.

According to the protocol stack design of FIG. 3, GTP-U tunneling is used between the eNodeB and the WIG, alike the X2-interface extensions (e.g. the GTP-U extension header) for enabling either LTE-DC-3C or X2 packet forwarding during handover, and SCTP user-plane data forwarding (i.e. a SCTP user data flow) is used between the WIG and the UE (thus, the WIG and the UE constitute or comprise SCTP (link) terminations). Similarly, a control plane interface would be used to convey control information related to user data flow management. Accordingly, such protocol stack design has minimal impact to the E-UTRAN X2 interface for user plane, as well as the WLAN AP implementation.

Further, L2 VLAN (Layer 2 Virtual Local Area Network) is used to be able to segregate packets towards a given UE and a given WLAN AP. Such segregation is useful for performing QoS and security/encryption functionalities. The mapping UE-AP and the mapping UE-eNodeB are assumed to be available at the WIG, e.g. through an advanced NAT function.

According to the protocol stack design of FIG. 3, multi-hop flow control is enabled/realized. That is, flow control for user-plane data forwarding at the eNodeB, namely between the eNodeB and the WIG, is performed on the basis of the SCTP performance for user-plane data forwarding on the next hop, i.e. between the WIG and the UE. To this end, performance data and/or performance metrics can be provided as performance feedback for flow control and packet loss detection, which is indicative of the SCTP performance between the WIG and the UE, from the WIG to the eNodeB. In this regard, GTP-U tunneling can be used between the eNodeB and the WIG for enabling uplink performance feedback, e.g. using the GTP-U extension header for facilitating packet loss detection/feedback and flow control at the eNodeB. Yet, as mentioned above, usage of GTP-U tunneling (or any other kind of tunneling) is not required for exemplifying embodiments of the present invention.

Such performance data can be provided from the UE SCTP termination to the WIG via the WLAN (IEEE 802.11) air interface (i.e. via WiFi), avoiding any impact on the WLAN AP. Non-limiting examples of the reports that the UE can send to the WIG as performance feedback are Selective Ack (SACK) and Report Gaps in Received DATA TSNs, as specified for SCTP. For example, when the number of gaps experienced in the received data reduces, the data flow rate used by the eNodeB towards the WIG can be increased in the context of flow control, and vice versa. The WIG can then compute/derive performance metrics based on the received performance data, i.e. based on those UE reports and/or SCTP connection status (i.e. congestion window), and provide the performance data and/or the performance as performance feedback for the purpose of flow control to the eNodeB.

Generally, performance metrics are capable of indicating one or more parameters relating to flow control per terminal, per network element of the wireless local area network, per network element of the cellular radio access network, per radio access bearer or per radio access bearer group are applicable, such as available buffer size, achieved data rate per terminal, aggregated data rate, aggregated congestion window, aggregated number of gaps in a sequence of user-plane data packets, and packet loss rate.

In this regard, the following non-limiting examples can be mentioned as performance metrics, which may be computed/derived by the WIG:

The achieved data rate per UE. This metric is based on the amount of bytes which are transmitted and the amount of bytes for which acknowledgment is received. This metric can be used e.g. in a rate-based flow control, where the rate on the X2-type of interface, per a specific UE cannot be higher than the rate on the next hop.

The aggregated data rate in respect of a given eNodeB, and of a given eNodeB towards a given WLAN AP. Since the SCTP-based metric takes into account both the WLAN AP backhaul and the wireless transports, such a metric could provide specific indication on whenever the backhaul is the bottleneck. Furthermore, such a metric could be used for load balancing and admission control purposes.

The aggregated congestion window characterizing all the traffic from a given eNodeB. Such a metric is similar to the achieved data rate, though this is the maximum achievable in a certain period of time, since the congestion control mechanism does not allow for higher bandwidth.

The aggregated number of gaps per UE, per AP and/or per eNodeB. This metric represents the reliability of the link.

The packet loss rate (also referred to as packet drop rate), based on both the frequency of gaps and the dropping due to timeouts or retransmission limits, per UE, per AP and/or per eNodeB. This metric represents the reliability of the link, but keeping into account both the link stability and how fast it can get rid of the data.

Further, in terms of performance feedback, flow control functionality for the 3GPP X2-U interface for LTE DC-3C can be adopted in view of the protocol stack design for the eNodeB-WIG interface. This includes, for example, that when the slave node (here, the WIG) decides to trigger feedback for downlink data delivery it shall report: the highest PDCP PDU sequence number successfully delivered in sequence to the UE among those PDCP PDUs received from the master node (here, the eNodeB); the desired buffer size in bytes for the concerned E-RAB, possibly counted from the highest PDCP PDU sequence number mentioned above; the desired buffer size in bytes for the UE, possibly counted from the highest PDCP PDU sequence number mentioned above for the concerned E-RAB and most recent PDCP PDU sequence numbers reported for all other E-RABs established for the UE; and those X2-U packets that were declared as being "lost" by the slave node (here, the WIG) and have not yet been reported to the master node (here, the eNodeB).

According to exemplifying embodiments of the present invention, the performance metrics used could cover all the potential points of failure/degradation of the system, enabling the WIG to communicate to the eNodeB not only that there are issues in reliability/performance of data delivery, but also providing a possible cause for it.

According to exemplifying embodiments of the present invention, the performance metrics can be computed/derived per bearer (e.g. E-RAB) or group of bearers (e.g. E-RABs). If so, a specific configuration of the WIG is required. In particular, one SCTP stream per flow ID would need to be opened and maintained in order to collect flow/bearer-specific information. Furthermore, each SCTP stream, coming from a specific bearer would need to be marked with a different flow ID and DiffServ in the IPv6 header, in the WIG-UE connection, allowing identifying the original bearer and maintaining the proper QoS prioritization.

As mentioned above, the WIG will then exchange with the eNodeB the performance data and/or metrics, and potentially also dedicated reports. Those reports can be configured to be provided per UE, per bearer, and/or as aggregated per eNodeB or per WLAN AP. The reports can be sent on a periodical and/or event/demand-triggered basis. The latter means that the eNodeB can be capable to trigger a report from the WIG. Also, it means that the WIG is capable to send an unsolicited performance indication when some event or demand occurs, e.g. when a specific performance metric falls above or below a configured threshold. Based on the reception of such performance indications, the eNodeB is able to execute flow control, i.e. to adjust the flow control of the user plane for e.g. a specific UE, a specific WLAN AP, or the like.

It is to be noted that a specific exchange of performance indications between the WIG and the eNodeB according to exemplifying embodiments of the present invention is described above. However, such specific exchange of performance indications is not required, and exemplifying embodiments of the present invention are also applicable with signaling currently standardized for support of flow control over the X2 interface with LTE-DC-3C or X2 packet forwarding during handover, i.e. without any additional signaling and thus limiting the amount of required signaling.

Figure 4:
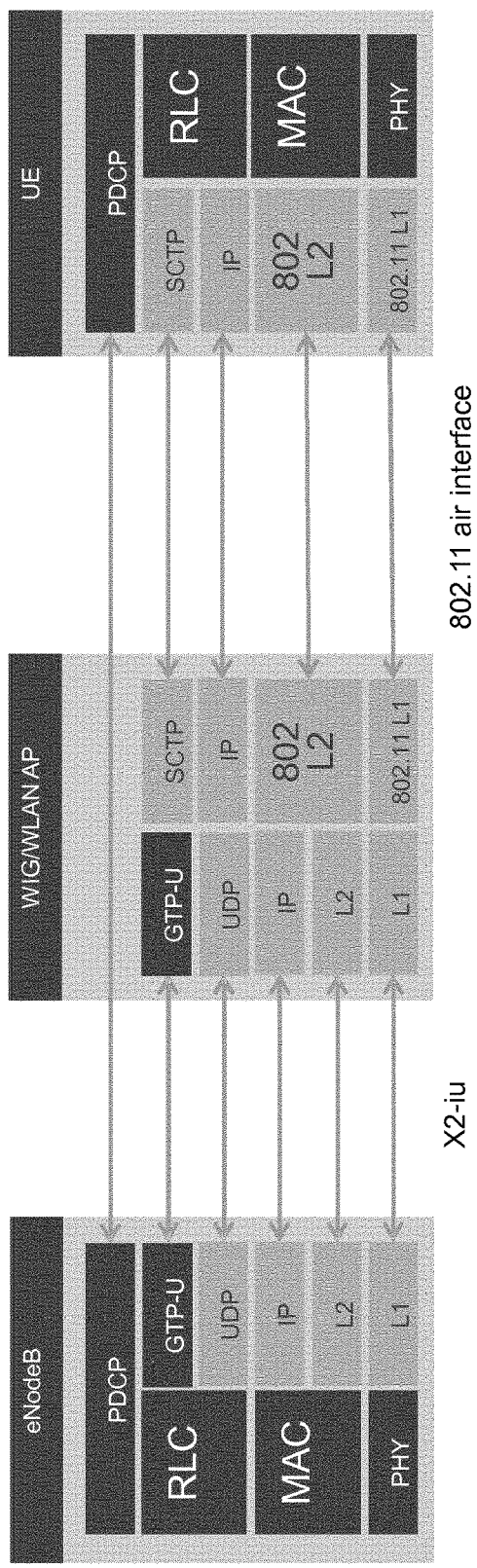
FIG. 4 shows a diagram of a second protocol stack design according to exemplifying embodiments of the present invention.

FIG. 4 shows a diagram of a second protocol stack design according to exemplifying embodiments of the present invention.

The protocol stack design of FIG. 4 is similar to that of FIG. 3. Hence, reference is made to the above description of FIG. 3 for details, while the following description of FIG. 4 mainly refers to differences there-between.

The protocol stack design of FIG. 4 is based on the assumption that the eNodeB communicate directly with the WLAN AP, which in the present example is assumed to be collocated with a WLAN interworking gateway (WIG). The interface between the eNodeB and the WLAN AP (i.e. the combined WIG and WLAN AP) can be regarded as a specified (logical) interface between a RAN network element and a WLAN network element according to exemplifying embodiments of the present invention, herein denoted as X2-iu. Such scenario may represent the case e.g. of a 3GPP (LTE) small cell with integrated/collocated eNodeB and WIG/WLAN AP.

According to the protocol stack design of FIG. 4, GTP-U tunneling is used between the eNodeB and the WLAN AP, alike the X2-interface extensions (e.g. the GTP-U extension header) for enabling either LTE-DC-3C or X2 packet forwarding during handover, and SCTP user-plane data forwarding (i.e. a SCTP user data flow) is used between the WLAN AP and the UE (thus, the WLAN AP and the UE constitute or comprise SCTP (link) terminations). Accordingly, such protocol stack design has minimal impact to the E-UTRAN X2 interface for user plane, but has some impact to the WLAN AP implementation.

Similar to the protocol stack design of FIG. 3, multi-hop flow control is enabled/realized according to the protocol stack design of FIG. 4. That is, flow control for user-plane data forwarding at the eNodeB, namely between the eNodeB and the WLAN AP, is performed on the basis of the SCTP performance for user-plane data forwarding on the next hop, i.e. between the WLAN AP and the UE. To this end, performance data and/or performance metrics can be provided as performance feedback for flow control and packet loss detection, which is indicative of the SCTP performance between the WLAN AP and the UE, from the WLAN AP to the eNodeB. In this regard, GTP-U tunneling can be used between the eNodeB and the WLAN AP for enabling uplink performance feedback, e.g. using the GTP-U extension header for facilitating packet loss detection/feedback and flow control at the eNodeB. Yet, as mentioned above, usage of GTP-U tunneling (or any other kind of tunneling) is not required for exemplifying embodiments of the present invention.

Such performance data can be provided from the UE SCTP termination to the WLAN AP via the WLAN (IEEE 802.11) air interface (i.e. via WiFi). As mentioned above, the WLAN AP can then compute/derive performance metrics based on the received performance data, i.e. based on those UE reports and/or SCTP connection status (i.e. congestion window), and provide the received performance data and/or the computed/derived performance metrics as performance feedback the eNodeB for the purpose of flow control.

Any specifics and examples for performance feedback and performance metrics, as described above in connection with FIG. 3, are equally applicable here as well.

FIG. 5 shows flow diagram illustrating an example of a procedure on the basis of the first protocol stack design according to exemplifying embodiments of the present invention.

Basically, the procedure of FIG. 5 illustrates the above-described sequence of operations on the basis of the protocol stack design of FIG. 3, representing an exemplary implementation of the generic procedure of FIG. 2, and thus an elaborate description thereof is omitted here.

In brief, the eNodeB performs user-plane data forwarding control by selecting a user data path for the user data flow, namely the WLAN path, and initiates communication of the user data flow towards the UE via the WIG and the WLAN AP (which may be integrated/combined, as is the case with the protocol stack design of FIG. 4). The eNodeB sends the user data flow to the WIG through an X2-type interface, herein denoted as X2-iu. The WIG forwards the user data flow, i.e. the user-plane data packets, through an already opened SCTP stream. It is noted that the user-plane data packets can be PDCP PDUs being conveyed using SCTP. The UE detects SCTP stream performance about the performance of the user data stream, and feeds back a report on SCTP stream performance, i.e. performance data, to the WIG, which is the other SCTP termination, according to the regular SCTP functionality. The WIG computes/derives (e.g. aggregated) performance metrics, and finally reports back the received performance data and/or the computed/derived (e.g. aggregated) performance metrics (e.g. in an unsolicited or periodical way) to the eNodeB. The eNodeB performs flow control (e.g. including congestion avoidance and control) based thereon.

Also, the received performance data and/or the computed/derived performance metrics can be used by the WIG to request forwarding of more or less user-plane data; that is, the flow control (by/at the eNodeB) can be triggered/initiated (and regulated) by the WIG. In this case, it is not the performance data and/or metrics which is provided to the eNodeB but rather kind of flow control request. In the present specification, such kind of flow control request from the WIG to the eNodeB is also meant to represent performance feedback in the meaning of exemplary embodiments of the present invention.

For example, the stream performance data may be transmitted from the UE to the WIG using SCTP, i.e. the reliable transport protocol, and/or the stream performance feedback may be transmitted from the WIG to the eNodeB using GTP-U, i.e. the cellular tunneling protocol.

More generally speaking, according to exemplifying embodiments of the present invention, user-plane data packets are transmitted to a network element of the wireless local area network, which may be accomplished e.g. using a cellular tunneling protocol, for transporting the same from the network element of the wireless local area network to the terminal using the reliable transport protocol, and performance feedback is obtained at the network element of the cellular radio access network, which includes reception of performance data and/or metrics from said network element of the wireless local area network e.g. using the cellular tunneling protocol. Further, the flow control is executed at the network element of the cellular radio access network on the basis of the received performance feedback.

FIG. 6 shows a diagram of a third protocol stack design according to exemplifying embodiments of the present invention.

The protocol stack design of FIG. 6 is similar to that of FIG. 3. Hence, reference is made to the above description of FIG. 3 for details, while the following description of FIG. 6 mainly refers to differences there-between.

According to the protocol stack design of FIG. 6, GTP-U tunneling is used between the eNodeB and the WIG, alike the X2-interface extensions (e.g. the GTP-U extension header) for enabling either LTE-DC-3C or X2 packet forwarding during handover, and SCTP user-plane data forwarding (i.e. a SCTP user data flow) is used between the eNodeB and the UE (thus, the eNodeB and the UE constitute or comprise SCTP (link) terminations). Accordingly, such protocol stack design has minimal impact to the E-UTRAN X2 interface for user plane, as well as the WLAN AP implementation.

According to the protocol stack design of FIG. 6, one-hop flow control is enabled/realized. That is, flow control for user-plane data forwarding at the eNodeB, namely between the eNodeB and the UE, is performed on the basis of the SCTP performance for user-plane data forwarding on the entire path, i.e. between the eNodeB and the UE. To this end, performance data can be provided as performance feedback for flow control and packet loss detection, which is indicative of the SCTP performance between the eNodeB and the UE, from the UE to the eNodeB. In this regard, GTP-U tunneling can be used between the eNodeB and the WIG for enabling uplink performance feedback, e.g. using the GTP-U extension header for facilitating packet loss detection/feedback and flow control at the eNodeB. Yet, as mentioned above, usage of GTP-U tunneling (or any other kind of tunneling) is not required for exemplifying embodiments of the present invention.

Such performance data can be provided from the UE SCTP termination to the eNodeB via the WLAN (IEEE 802.11) air interface (i.e. via WiFi), avoiding any impact on the WLAN AP. The eNodeB can then compute/derive performance metrics based on the received performance data, i.e. based on those UE reports and/or SCTP connection status (i.e. congestion window), and use the same as performance feedback for the purpose of flow control.

As compared with the exemplary implementation according to the protocol stack design of FIG. 3, the exemplary implementation according to the protocol stack design of FIG. 6 makes flow control simpler, as the SCTP performance metrics are directly available and their meaning understood at the eNodeB (with no or limited further exchange required between the eNodeB and the WIG). On the other hand, the exemplary implementation according to the protocol stack design of FIG. 6 may have a larger impact on the assumed baseline E-UTRAN X2 interface for user plane.

Any specifics and examples for performance feedback and performance metrics, as described above in connection with FIG. 3, are equally applicable here as well, with the only exception that the eNodeB carries out respective computations/derivations rather than the WIG.

FIG. 7 shows a diagram of a fourth protocol stack design according to exemplifying embodiments of the present invention.

The protocol stack design of FIG. 7 is similar to that of FIG. 3. Hence, reference is made to the above description of FIG. 3 for details, while the following description of FIG. 7 mainly refers to differences there-between.

The protocol stack design of FIG. 7 is based on the assumption that the eNodeB communicate directly with the WLAN AP, which in the present example is assumed to be collocated with a WLAN interworking gateway (WIG). The interface between the eNodeB and the WLAN AP (i.e. the combined WIG and WLAN AP) can be regarded as a specified (logical) interface between a RAN network element and a WLAN network element according to exemplifying embodiments of the present invention, herein denoted as X2-iu. Such scenario may represent the case e.g. of a 3GPP (LTE) small cell with integrated/collocated eNodeB and WIG/WLAN AP.

According to the protocol stack design of FIG. 7, GTP-U tunneling is used between the eNodeB and the WLAN AP, alike the X2-interface extensions (e.g. the GTP-U extension header) for enabling either LTE-DC-3C or X2 packet forwarding during handover, and SCTP user-plane data forwarding (i.e. a SCTP user data flow) is used between the eNodeB and the UE (thus, the eNodeB and the UE constitute or comprise SCTP (link) terminations). Accordingly, such protocol stack design has minimal impact to the E-UTRAN X2 interface for user plane, but has some impact to the WLAN AP implementation.

Similar to the protocol stack design of FIG. 6, one-hop flow control is enabled/realized according to the protocol stack design of FIG. 7. That is, flow control for user-plane data forwarding at the eNodeB, namely between the eNodeB and the UE, is performed on the basis of the SCTP performance for user-plane data forwarding on the entire path, i.e. between the eNodeB and the UE. To this end, performance data can be provided as performance feedback for flow control and packet loss detection, which is indicative of the SCTP performance between the eNodeB and the UE, from the UE to the eNodeB. In this regard, GTP-U tunneling can be used between the eNodeB and the WIG for enabling uplink performance feedback, e.g. using the GTP-U extension header for facilitating packet loss detection/feedback and flow control at the eNodeB. Yet, as mentioned above, usage of GTP-U tunneling (or any other kind of tunneling) is not required for exemplifying embodiments of the present invention.

Such performance data can be provided from the UE SCTP termination to the eNodeB via the WLAN (IEEE 802.11) air interface (i.e. via WiFi). The eNodeB can then compute/derive performance metrics based on the received performance data, i.e. based on those UE reports and/or SCTP connection status (i.e. congestion window), and use the same as performance feedback for the purpose of flow control.

As compared with the exemplary implementation according to the protocol stack design of FIG. 3, the exemplary implementation according to the protocol stack design of FIG. 7 makes flow control simpler, as the SCTP performance metrics are directly available and their meaning understood at the eNodeB (with no or limited further exchange required between the eNodeB and the WIG). On the other hand, the exemplary implementation according to the protocol stack design of FIG. 7 may have a larger impact on the assumed baseline E-UTRAN X2 interface for user plane.

Any specifics and examples for performance feedback and performance metrics, as described above in connection with FIG. 3, are equally applicable here as well, with the only exception that the eNodeB carries out respective computations/derivations rather than the WIG.

FIG. 8 shows flow diagram illustrating an example of a procedure on the basis of the second or third protocol stack design according to exemplifying embodiments of the present invention.

Basically, the procedure of FIG. 8 illustrates the above-described sequence of operations on the basis of the protocol stack design of FIG. 6 or FIG. 7, representing an exemplary implementation of the generic procedure of FIG. 2, and thus an elaborate description thereof is omitted here.

In brief, the eNodeB performs user-plane data forwarding control by selecting a user data path for the user data flow, namely the WLAN path, and initiates communication of the user data flow towards the UE via the WIG and the WLAN AP (which may be integrated/combined, as is the case with the protocol stack design of FIG. 7). The eNodeB sends the user data flow to the UE through an already opened SCTP stream. It is noted that the user-plane data packets can be PDCP PDUs being conveyed using SCTP. The UE detects SCTP stream performance about the performance of the user data stream, and feeds back a report on SCTP stream performance, i.e. performance data, to the eNodeB, which is the other SCTP termination, according to the regular SCTP functionality. The eNodeB computes/derives (e.g. aggregated) performance metrics, and finally performs flow control (e.g. including congestion avoidance and control) based thereon.

More generally speaking, according to exemplifying embodiments of the present invention, user-plane data packets are transported via a network element of the wireless local area network to the terminal using a reliable transport protocol, and the performance feedback is obtained at the network element of the cellular radio access network, which includes reception of performance data from said network element of the wireless local area network e.g. using the cellular tunneling protocol and/or computation/derivation of performance metrics locally at the network element of the cellular radio access network. Further, the flow control is executed at the network element of the cellular radio access network on the basis of received performance data and/or the computed/derived performance metrics.

By virtue of exemplifying embodiments of the present invention, as evident from the above, an interface functionality for RAN-WLAN radio aggregation, i.e. radio level integration/aggregation between a cellular radio access network and a wireless area network, can be enabled/realized. Based on such interface functionality, reliable user-plane data packet delivery and flow control for user-plane data forwarding can be enabled/realized for RAN-WLAN radio aggregation.

Stated in other words, exemplifying embodiments of the present invention define a specific (logical/direct) interface between a RAN network element and a WLAN network element for RAN-WLAN radio aggregation, in the form of protocol stack designs and associated functional/operational principles. Thereby, reliable user-plane data packet delivery and flow control for user-plane data forwarding for RAN-WLAN radio aggregation is supported with low complexity, both in terms of standardization and implementation.

In view of the above, it can be summarized that at least some exemplifying embodiments of the present invention provide for protocol stack designs and associated functional/operational principles, which support terminal-assisted flow control functionality and packet loss detection for the purpose of RAN-WLAN radio aggregation, wherein the flow control is intended for user-plane data forwarding between the RAN and the WLAN. In this regard, a reliable transport protocol (such as e.g. SCTP) is used between the RAN or the WLAN and the terminal, which operates below a cellular data convergence protocol (such as e.g. PDCP), i.e. it conveys corresponding PDUs of the cellular data convergence protocol, on the user-plane path between the WLAN or the RAN and the terminal. Then, flow control and packet loss detection for the user-plane path over the WLAN can be based on the performance of such reliable transport protocol, either based on the performance of the entire path or on the next hop.

Various technical effects and advantages can be achieved by exemplifying embodiments of the present invention, such as for example the following.

- The presented solutions are rather transparent to the WLAN AP. That is, RAN-WLAN radio aggregation can be implemented with limited or even no changes to legacy WLAN APs. Avoiding any (significant) impact on the WLAN AP makes it possible for an operator to use the existing WLAN AP footprint, without the need to swap it when deploying RAN-WLAN radio aggregation. Such functionality can also be added as additional soft feature in already deployed WAG-based systems. For future evolutions, such functionality can be implemented in pure software, and it can be moved closer to the WLAN AP, allowing a direct X2-type of connection per each WLAN AP.
- Harvesting on transport layer features, i.e. performance features of the reliable transport protocol, the presented solutions support low-complexity flow control, to optimally allocate resources between the two networks (including joint radio resource management), and assured delivery, both of which are critical functionalities to achieve good performance for dual connectivity.
- The presented solutions are applicable for single-hop or multi-hop flow control, which allows for improved performance and reduced delay. This is because packets will be able to be served without incurring any retransmission in a higher layer, allowing a smooth RAN-to-UE user data flow.
- The presented solutions apply a reliable transport protocol on the WLAN path, namely either between the relevant WLAN element (e.g. WIG) and UE or even between the relevant RAN element (e.g. eNodeB) and UE. This allows for collection of link performance statistics with reduced complexity, both in terms of standardization and implementation.
- The presented solutions incur minimal impact to existing specifications for the 3GPP X2 interface for user-plane data.
- The presented solutions is capable of reusing existing specifications for LTE dual connectivity with bearer split functionality, i.e. the 3GPP X2-U interface for LTE DC-3C. Accordingly, flow control functionality for the 3GPP X2-U interface for LTE DC-3C can be easily adopted, such as flow control indications (e.g. indication of available buffer size in slave node, transmit buffer above a certain threshold, excessive packet drops, etc.) per E-RAB, per E-RAB group, per UE, or cumulative for all split bearers/UEs configured with split bearers in the corresponding (small) cell.
- According to exemplifying embodiments of the present invention, a reliable transport protocol can be efficiently utilized (e.g. SCTP) such that its inherent flow control capabilities can be enhanced, e.g. to facilitate multi-hop flow control when user-plane date forwarding on only part of the entire path is effected using this transport protocol (e.g. SCTP). Hence, an effective combination of the functionality of the reliable transport protocol (e.g. SCTP) and flow control is achieved.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 9 and 10, while for the sake of brevity reference is made to the detailed description of respective corresponding configurations/setups, schemes, methods and functionality, principles and operations according to FIGS. 1 to 8.

Figure 9:
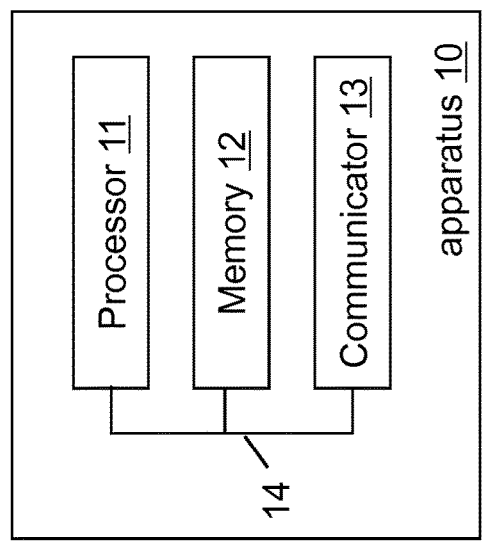
FIG. 9 shows a schematic diagram illustrating an example of a structure of apparatuses according to exemplifying embodiments of the present invention.
Figure 10:
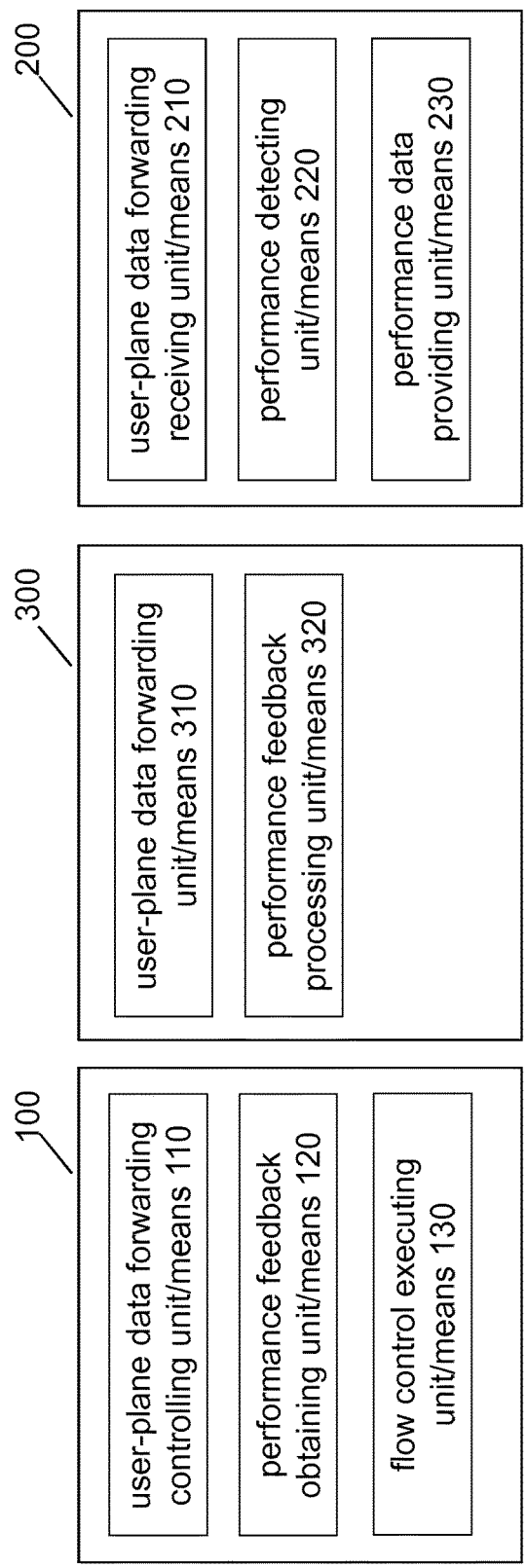
FIG. 10 shows a schematic diagram illustrating another example of a structure of apparatuses according to exemplifying embodiments of the present invention.

In FIGS. 9 and 10, the blocks are basically configured to perform respective methods, procedures and/or functions as described above. The entirety of blocks is basically configured to perform the methods, procedures and/or functions as described above, respectively. With respect to FIG. 10, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 9 and 10, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 9 shows a schematic diagram illustrating an example of a structure of apparatuses according to exemplifying embodiments of the present invention.

As indicated in FIG. 9, according to exemplifying embodiments of the present invention, an apparatus 10 may comprise at least one processor 11 and at least one memory 12 (and possibly also at least one communicator 13), which may be operationally connected or coupled, for example by a bus 14 or the like, respectively.

The processor 11 and/or the communicator 13 of the apparatus 10 may also include a modem or the like to facilitate communication over a (hardwire or wireless) link, respectively. The communicator 13 of the apparatus 10 may include a suitable transmitter, receiver or transceiver connected or coupled to one or more antennas, antenna units, such as antenna arrays or communication facilities or means for (hardwire or wireless) communications with the linked, coupled or connected device(s), respectively. The communicator 13 of the apparatus 10 is generally configured to communicate with at least one other apparatus, device, node or entity (in particular, the communicator thereof).

The memory 12 of the apparatus 10 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 12 of the apparatus 10 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 10 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

On the one hand, the thus illustrated apparatus 10 may represent or realize/embody a (part of a) RAN element, as illustrated in FIG. 1. Specifically, the thus illustrated apparatus 10 may be configured to perform a procedure and/or exhibit a functionality and/or implement a protocol stack, as described, for the RAN element or the eNodeB, in any one of FIGS. 2 to 8.

Accordingly, the apparatus 10 may be caused or the apparatus 10 or its processor 11 (possibly together with computer program code stored in the memory 12), in its most basic form, is configured to control user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, receive feedback on performance of user-plane data packets transport using the reliable transport protocol, at least, from the wireless local area network, and execute flow control for the user-plane data forwarding from the cellular radio access network over the wireless local area network to the terminal on the basis of the obtained performance feedback.

On the other hand, the thus illustrated apparatus 10 may represent or realize/embody a (part of a) terminal, as illustrated in FIG. 1. Specifically, the thus illustrated apparatus 10 may be configured to perform a procedure and/or exhibit a functionality and/or implement a protocol stack, as described, for the terminal or the UE, in any one of FIGS. 2 to 8.

Accordingly, the apparatus 10 may be caused or the apparatus 10 or its processor 11 (possibly together with computer program code stored in the memory 12), in its most basic form, is configured to receive user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, detect performance of user-plane data packets transport using the reliable transport protocol, and provide performance data of the detected performance to the wireless local area network for providing performance feedback to the cellular radio access network.

As mentioned above, any apparatus according to exemplifying embodiments of the present invention may be structured by comprising respective units or means for performing corresponding operations, procedures and/or functions. For example, such units or means may be implemented/realized on the basis of an apparatus structure, as exemplified in FIG. 9, i.e. by one or more processors 11, one or more memories 12, one or more communicators 13, or any combination thereof.

FIG. 10 shows a schematic diagram illustrating another example of a structure of apparatuses according to exemplifying embodiments of the present invention.

As shown in FIG. 10, an apparatus 100 according to exemplifying embodiments of the present invention, which represents or realizes/embodies a (part of a) RAN element, may comprise (at least) a unit or means for controlling user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal (denoted as user-plane data forwarding controlling unit/means 110), a unit or means for obtaining feedback on performance of user-plane data packets transport using the reliable transport protocol, at least, from the wireless local area network (denoted as performance feedback obtaining unit/means 120), and a unit or means for executing flow control for the user-plane data forwarding from the cellular radio access network over the wireless local area network to the terminal on the basis of the obtained performance feedback (denoted as flow control executing unit/means 130).

As shown in FIG. 10, an apparatus 200 according to exemplifying embodiments of the present invention, which represents or realizes/embodies a (part of a) WLAN element, may comprise (at least) a unit or means for receiving user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal (denoted as user-plane data forwarding receiving unit/means 210), a unit or means for detecting performance of user-plane data packets transport using the reliable transport protocol (denoted as performance detecting unit/means 220), and a unit or means for providing performance data of the detected performance to the wireless local area network for providing performance feedback to the cellular radio access network (denoted as performance data providing unit/means 230).

As shown in FIG. 10, an apparatus 300 according to exemplifying embodiments of the present invention may represent or realize/embody a (part of a) WLAN element, as illustrated in FIG. 1. Specifically, the thus illustrated apparatus may be configured to perform a procedure and/or exhibit a functionality and/or implement a protocol stack, as described, for the WLAN element or the WIG or WIG/WLAN AP, in any one of FIGS. 2 to 8. Such apparatus may comprise (at least) a unit or means for forwarding user-plane data forwarding from a cellular radio access network over a wireless local area network to a terminal, wherein in the user-plane data forwarding user-plane data packets according to a cellular data convergence protocol are transported, at least partly, using a reliable transport protocol over the wireless local area network to the terminal (denoted as user-plane data forwarding unit/means 310), and a unit or means for processing feedback on performance of user-plane data packets transport using the reliable transport protocol (denoted as performance feedback processing unit/means 320), wherein the processing may comprise receiving performance data from the terminal, computing performance metrics based thereon, and providing the received performance data and/or the computed performance metrics to the cellular radio access network, or the processing may comprise receiving and providing, to the cellular radio access network, performance data from the terminal.

For further details regarding the operability/functionality of the individual apparatuses (or units/means thereof) according to exemplifying embodiments of the present invention, reference is made to the above description in connection with any one of FIGS. 1 to 8, respectively.

According to exemplifying embodiments of the present invention, any one of the processor, the memory and the communicator, as well as any one of the units/means, may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing interface functionality for RAN-WLAN radio aggregation, i.e. radio level integration/aggregation between a cellular radio access network and a wireless area network. Such measures exemplarily comprise user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, providing feedback on performance of user-plane data packets transport using the reliable transport protocol, at least partly, from the wireless local area network to the cellular radio access network, and executing flow control on the basis of the performance feedback.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
E-RAB E-UTRAN Radio Access Bearer
E-UTRAN Evolved Universal Terrestrial Radio Access Network
eNodeB enhanced Node B (LTE/LTE-A base station)
GPRS General Packet Radio Service
GRE Generic Routing Encapsulation
GTP-U GPRS Tunneling Protocol—User Plane
ID Identifier
I/F Interface
IEEE Institute of Electrical and Electronics Engineers
IP Internet Protocol
KPI Key Performance Indicator
L1/2 Layer 1/2 of OSI reference model
LTE Long Term Evolution
LTE-A Long Term Evolution Advanced
MAC Medium Access Control
NAT Network Address Translation
PDCP Packet data Convergence Protocol
PDU Packet Data Unit
PHY Physical Layer
QoS Quality of Service
RAN Radio Access Network
RLC Radio Link Control
RNC Radio Network Controller
SCTP Stream Control Transmission Protocol
TCP Transmission Control Protocol
TN Transport Network
TSN Transmission Sequence Number
WAG WLAN Access Gateway
WIG WLAN Interworking Gateway
WLAN Wireless Local Area Network
WLAN AP WLAN Access Point
UE User Equipment
UMTS Universal Mobile Telecommunications System
UTRAN Universal Terrestrial Radio Access Network
VLAN Virtual Local Area Network

The invention claimed is:

1. A method comprising
controlling user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal,
obtaining feedback on performance of user-plane data packets transport using the reliable transport protocol, at least, from the wireless local area network, and
executing flow control for the user-plane data forwarding from the cellular radio access network over the wireless local area network to the terminal on the basis of the obtained performance feedback.

2. The method according to claim 1, wherein
the user-plane data packets are transmitted to a network element of the wireless local area network for transporting the same from the network element of the wireless local area network to the terminal using the reliable transport protocol, and
the performance feedback is received from said network element of the wireless local area network.

3. The method according to claim 2, wherein
the performance feedback comprises performance data from the terminal and/or performance metrics indicating one or more parameters relating to flow control per terminal, per network element of the wireless local area network, per network element of the cellular radio access network, per radio access bearer or per radio access bearer group, such as available buffer size, achieved data rate per terminal, aggregated data rate, aggregated congestion window, aggregated number of gaps in a sequence of user-plane data packets, and packet loss rate, and
the flow control is executed on the basis of the received performance data and/or performance metrics.

4. The method according to claim 1, wherein
the user-plane data packets are transported via a network element of the wireless local area network to the terminal using the reliable transport protocol, and
the performance feedback comprises performance data from the terminal, which is received from said network element of the wireless local area network.

5. The method according to claim 4, wherein
performance metrics indicating one or more parameters relating to flow control per terminal, per network element of the wireless local area network, per network element of the cellular radio access network, per radio access bearer or per radio access bearer group, such as available buffer size, achieved data rate per terminal, aggregated data rate, aggregated congestion window, aggregated number of gaps in a sequence of user-plane data packets, and packet loss rate, are computed on the basis of the received performance data, and the flow control is executed on the basis of the received performance data and/or the computed performance metrics.

6. A method comprising receiving user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, detecting performance of user-plane data packets transport using the reliable transport protocol, and providing performance data of the detected performance to the wireless local area network for providing performance feedback to the cellular radio access network.

7. The method according to claim 6, wherein the user-plane data packets are transported from a network element of the wireless local area network to the terminal using the reliable transport protocol, and the performance data is provided via a radio interface of the wireless local area network towards said network element of the wireless local area network.

8. The method according to claim 6, wherein the user-plane data packets are transported from a network element of the cellular radio access network via a network element of the wireless local area network to the terminal using the reliable transport protocol, and the performance data is provided via a radio interface of the wireless local area network towards said network element of the cellular radio access network.

9. The method according to claim 6, wherein the performance data is suitable for computing performance metrics indicating one or more parameters relating to flow control per terminal, per network element of the wireless local area network, per network element of the cellular radio access network, per radio access bearer or per radio access bearer group, such as available buffer size, achieved data rate per terminal, aggregated data rate, aggregated congestion window, aggregated number of gaps in a sequence of user-plane data packets, and packet loss rate.

10. An apparatus comprising a processor, and a memory configured to store computer program code, wherein the processor is configured to cause the apparatus at least to:

control user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, obtain feedback on performance of user-plane data packets transport using the reliable transport protocol, at least, from the wireless local area network, and execute flow control for the user-plane data forwarding from the cellular radio access network over the wireless local area network to the terminal on the basis of the obtained performance feedback.

11. The apparatus according to claim 10, wherein the processor is configured to cause the apparatus to transmit the user-plane data packets to a network element of the wireless local area network for transporting the same from the network element of the wireless local area network to the terminal using the reliable transport protocol, and to receive the performance feedback from said network element of the wireless local area network.

12. The apparatus according to claim 11, wherein the performance feedback comprises performance data from the terminal and/or performance metrics indicating one or more parameters relating to flow control per terminal, per network element of the wireless local area network, per network element of the cellular radio access network, per radio access bearer or per radio access bearer group, such as available buffer size, achieved data rate per terminal, aggregated data rate, aggregated congestion window, aggregated number of gaps in a sequence of user-plane data packets, and packet loss rate, and the processor is configured to cause the apparatus to execute the flow control on the basis of the received performance data and/or performance metrics.

13. The apparatus according to claim 10, wherein the processor is configured to cause the apparatus to transport the user-plane data packets via a network element of the wireless local area network to the terminal using the reliable transport protocol, and the performance feedback comprises performance data from the terminal, which is received from said network element of the wireless local area network.

14. The apparatus according to claim 13, wherein the processor is configured to cause the apparatus to compute, on the basis of the received performance data, performance metrics indicating one or more parameters relating to flow control per terminal, per network element of the wireless local area network, per network element of the cellular radio access network, per radio access bearer or per radio access bearer group, such as available buffer size, achieved data rate per terminal, aggregated data rate, aggregated congestion window, aggregated number of gaps in a sequence of user-plane data packets, and packet loss rate, and the processor is configured to cause the apparatus to execute the flow control on the basis of the received performance data and/or the computed performance metrics.

15. An apparatus comprising a processor, and a memory configured to store computer program code, wherein the processor is configured to cause the apparatus at least to:

receive user-plane data forwarding from a cellular radio access network over a wireless local area network to a terminal, both the cellular radio access network and the wireless local area network providing radio level connectivity for the terminal, wherein in the user-plane data forwarding user-plane data packets according to a cellular data convergence protocol are transported, at least partly, using a reliable transport protocol over the wireless local area network to the terminal, detect performance of user-plane data packets transport using the reliable transport protocol, and provide performance data of the detected performance to the wireless local area network for providing performance feedback to the cellular radio access network.

16. The apparatus according to claim 15, wherein the processor is configured to cause the apparatus
- to receive the user-plane data packets being transported from a network element of the wireless local area network to the terminal using the reliable transport protocol, and
- to provide the performance data via a radio interface of the wireless local area network towards said network element of the wireless local area network.

17. The apparatus according to claim 15, wherein the processor is configured to cause the apparatus
- to receive the user-plane data packets being transported from a network element of the cellular radio access network via a network element of the wireless local area network to the terminal using the reliable transport protocol, and
- to provide the performance data via a radio interface of the wireless local area network towards said network element of the cellular radio access network.

18. The apparatus according to claim 15, wherein
the performance data is suitable for computing performance metrics indicating one or more parameters relating to flow control per terminal, per network element of the wireless local area network, per network element of the cellular radio access network, per radio access bearer or per radio access bearer group, such as available buffer size, achieved data rate per terminal, aggregated data rate, aggregated congestion window, aggregated number of gaps in a sequence of user-plane data packets, and packet loss rate.

19. The apparatus according to claim 15, wherein
the cellular radio access network comprises a radio access network of a LTE, a LTE-A, or an UMTS system, and/or the wireless local area network comprises a wireless local area network according to an IEEE 802.11 standard, and/or the reliable transport protocol comprises SCTP or TCP, and/or the cellular data convergence protocol comprises PDCP.

* * * * *